Patented Apr. 3, 1934

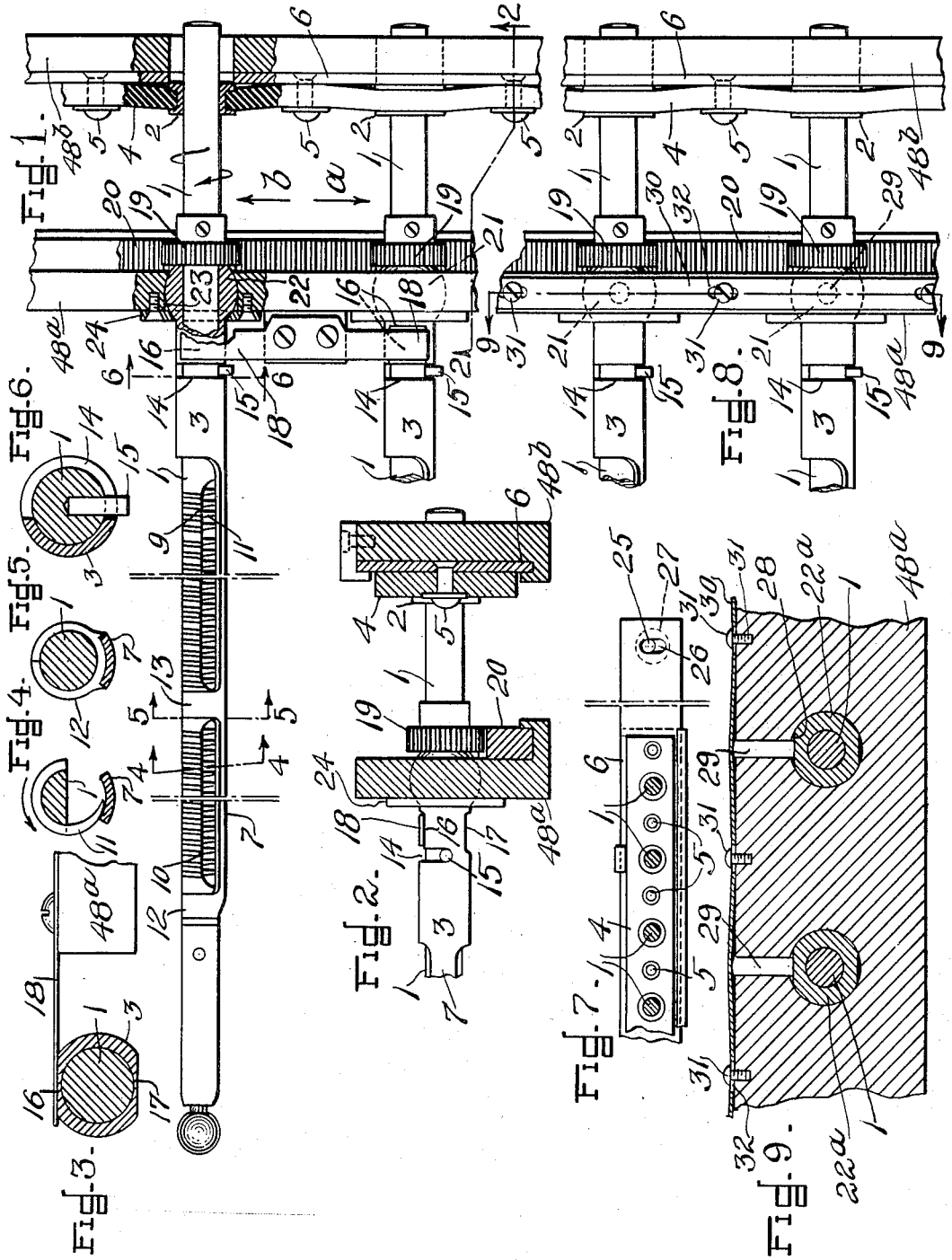

1,953,313

UNITED STATES PATENT OFFICE 1,953,313

COTTON PICKING MECHANISM

Harris G. Prouty and Joseph Bardwell, Whitman, Mass.

Application December 7, 1931, Serial No. 579,520

11 Claims. (Cl. 56—50)

This application is a continuation, in part, of our application for patent Serial No. 439,647, filed March 28, 1930, now Patent No. 1,834,994, dated December 8, 1931.

Our invention relates to cotton picking mechanisms and particularly to picker mechanisms for incorporation in cotton harvesting machines and the object of our invention is to provide improved picker mechanism of this class. More especially, our invention has for its object to provide improved picker mechanism for incorporation in a cotton harvesting machine such as is illustrated and described in our co-pending application Serial No. 399,848 filed October 15, 1929, now Patent No. 1,907,665, dated May 9, 1933.

In the machine just referred to the cotton is removed from the plants by a multiplicity of slender picker stems which are moved endwise into and out of the plants so that if said stems are rigidly mounted upon their support they are liable to be bent or broken when their free ends strike heavy branches as the stems are moved endwise into the plants, or if their carrier is displaced laterally while said stems occupy positions among the branches. Our invention is designed to prevent the stems from being bent or broken through these causes.

To these ends we have provided a picker mechanism for harvesting cotton, said mechanism having the peculiar features of construction and mode of operation set forth in the following description, the several novel features of our invention being particularly pointed out and defined separately in the claims at the close thereof.

Other features of our invention are hereinafter pointed out.

In the accompanying drawing:

Figure 1 is a plan view, partly broken away and in section, of a picker mechanism constructed in accordance with our invention.

Figure 2 is a section on line 2—2 of Figure 1.

Figure 3 is a sectional detail.

Figure 4 is a section on line 4—4 of Figure 1.

Figure 5 is a section on line 5—5 of Figure 1.

Figure 6 is a section on line 6—6 of Figure 1.

Figure 7 is a detail hereinafter described.

Figure 8 is a plan view of a portion of a picker mechanism embodying another form of our invention.

Figure 9 is a section on line 9—9 of Fig. 8.

The cotton harvesting machine of our application above referred to is a vehicle adapted to travel over the ground along a row of cotton plants, and as it traverses said row a multiplicity of picker elements carried thereby are moved into and out of the plants so as to remove the cotton bolls therefrom. These picker elements are mounted upon a carriage that is movable on the frame of the vehicle toward and from the plants of the row.

The picker elements are barbed stems and when their carrier frame is moved toward the row of plants said stems are projected into the latter and then rotated in one direction to cause the barbs of the stems to engage the bolls of cotton after which the carrier frame is moved away from the row of plants withdrawing the picker stems from the latter. When the carrier frame reaches the limit of its movement away from the plants the stems are rotated in the opposite direction to free the picked cotton from the barbs thereof.

In the accompanying drawing 48a and 48b illustrate two cross-bars which may constitute part of the movable picker carrier frame referred to above, said bars coresponding with one of the pairs of bars (48) of the machine illustated and described in our said co-pending application.

Each picker element of our improved picker mechanism comprises a spindle 1 which is rotatably supported adjacent its rear end by a metal bushing 2 and a short sleeve 3. The metal bushing 2 is fixed within an aperture provided through a strip of stiffly elastic rubber 4 fastened by rivets 5 to a relatively thin supplemental bar or rail 6 slidably supported in position against the inner side of the cross-bar 48b.

The sleeve 3 constitutes the rear end portion of a doffer-sheath 7 which as shown in Figs. 4 and 5 is arcuate in cross section and disposed parallel with, and close to, the spindle 1.

The spindle 1 is made from a length of round bar stock in which is formed a spiral groove extending throughout that portion of the length of the spindle that is opposite the doffer-sheath bar 7. Then the spindle 1 is cut away or recessed as at 9 and 10 so that only semi-circular portions of the originally spiral groove remain in the spindle 1. Then a barb 11 is fixed within each semi-convolution of the groove as illustrated clearly in Figs. 1 and 4.

At its forward end the doffer-sheath bar 7 is made with a split ring 12 that is rotatably mounted within an annular groove provided upon the forward end portion of the spindle 1. Also about midway of the length of the doffer-sheath bar 7 a similar split ring 13 is provided that is rotatably mounted within another annular groove provided in spindle 1.

The sleeve portion 3 of the doffer-sheath is formed with a circumferential slot 14 which is approximately one hundred and eighty degrees in length and occupied by a stud or pin 15 projecting radially from the spindle 1 as shown in Figs. 1 and 6. Thus it is possible for the sleeve and spindle to rotate relatively to the extent of one half of a revolution or one hundred and eighty degrees.

In Figs. 1, 2 and 3 the sleeve portion 3 of the doffer-sheath is made with two flat peripheral surfaces 16 and 17, Figs. 1 and 3, to co-operate with a leaf spring 18 fastened by screws to the cross-bar 48a. Normally the spring 18 is in engagement with the flat surface 16 and holds the doffer-sheath bar 7 opposite the free pointed ends of the barbs 11 as shown in Fig. 4.

When the picker stem is to be moved endwise forward into the plants the parts thereof occupy the positions shown in the drawing and they retain these positions until each picker stem reaches the limit of its forward movement. In the illustrated embodiments of our invention these stems are moved endwise toward the left to project the same into the plants of the row.

When the picker stems reach the limit of their movement toward or into the plants, each spindle 1 is rotated in the direction of the arrow, Figs. 1 and 4, to the extent of one revolution. During the first half of this revolution of each spindle 1 its sleeve 3 and doffer-sheath bar 7 are held against turning with the spindle by the spring 18 so that at the completion of the first half of the revolution of spindle 1 the doffer-sheath bar 7 is at one side of the spindle and the pointed ends of the barbs 11 are unsheathed and at the opposite side of the spindle. It will therefore be clear that during the last half of the revolution of the spindle 1 the barbs 11 will engage the cotton of the bolls and wrap the same more or less about the picker stem.

The parts of each picker stem remain in their cotton-engaging positions until each picker stem has been moved back endwise to the limit of its movement away from the cotton plants, whereupon each spindle 1 is rotated in the opposite direction to the extent of one complete revolution.

At the start of this reverse motion of the spindle 1 the spring 18 is in engagement with the flat surface 17 and therefore sleeve 3 and bar 7 are held stationary by said spring 18 during the first half of the backward revolution of spindle 1 so that as the barbs 11 pass into position under the doffer-sheath bar 7 the cotton is pushed off from the barbs by said bar after which the spindle 1 completes the last half of its backward revolution which restores the parts to their original positions with spring 18 in engagement with the flat surface 16 on sleeve 3.

As in the machine of our application referred to above, each spindle 1 has fast thereon a pinion 19 that is in mesh with a rack 20 that is slidably mounted upon the inner side of the cross-bar 48a and this rack is associated in said machine with means which automatically moves the same endwise in the direction of the arrow a, Fig. 1, a distance sufficient to impart one revolution in the direction of the arrow to each spindle 1 when the latter reaches the limit of its movement toward and into the plants and which also automatically moves the rack 20 in the direction of the arrow b, Fig. 1, a distance sufficient to rotate each spindle in a reverse direction to the extent of one revolution when said spindle reaches the limit of its movement away from the plants.

One of the features of the present invention consists in connecting the rear end of each sleeve 3 with the bar 48a by a ball and socket joint 21 so that said sleeve can swing universally on said joint 21 and also rotate. Also each pinion 19 is associated with the rack 20 so as to permit of substantial universal swinging movement of the sleeve 3 on the ball and socket joint 21. Normally the rubber strip 4 with its bushing 2 holds each spindle 1 with its axis perpendicular with relation to the cross-bars 48a and 48b.

It will therefore be clear that if the forward end of a picker stem strikes against a sturdy bough of the plant it may be deflected thereby sidewise in any direction, said bough operating to swing the free end of the picker stem laterally on the ball and socket joint 21 so that said stem will pass at one side of the bough thus avoiding injury to the picker stem. When the forward end of the picker stem is thus deflected laterally in one direction or another, the rubber strip 4 which supports the rear end of the spindle will yield to permit the movement of the spindle on the ball and socket joint 21. When the picker stem is withdrawn from the plants the rubber strip 4 will resume its normal condition and restore the picker stem to perpendicular relationship with the cross-bars 48a and 48b. As shown in the upper part of Fig. 1 the ball and socket joint 21 comprises a ball 22 that is formed upon the rear end of the sleeve 3, said ball being held within a socket 23 provided in cross-bar 48a by means of a ring retainer 24 fastened by screws to said cross-bar.

Another feature of the present invention consists in mounting the supplemental bar 6 on the cross-bar 48b so that it can move endwise thereon and in providing a wrist pin 25, Fig. 7, for reciprocating the supplemental bar 6 either continuously or intermittently at predetermined intervals.

As illustrated in Fig. 7 the wrist pin 25 may occupy a transverse slot 26 provided in the supplemental bar 6. The wrist pin 25 is illustrated as provided at one end of a shaft 27 mounted upon any convenient part of the frame of the machine and this shaft may be actuated by any convenient and suitable devices except that it is a desirable feature that the supplemental bar 6 is reciprocated as described during the time that the picker stems are moved endwise forward into the cotton plants. Thus as the picker stems are moved forward into the plants each is vibrated laterally on its ball and socket joint 21 which tends to prevent the forward end thereof from lodging against a bough of the plant.

In Figs. 8 and 9 the ball 22a of the sleeve 3 of each picker stem is made at opposite sides thereof with flat surfaces 28 to co-operate with one end of a stem 29 loosely mounted in a chamber formed in bar 48a and extending from ball 22a to the top of the bar. At its upper end the stem 29 bears against the under side of a spring metal strip 30 fastened by screws 31 to the top of bar 48a, said screws occupying longitudinal slots 32 provided in the strip 30.

As will be clear, the spring strip 30 acts through the stems 29 to yieldingly oppose rotation of the sleeves 3 so as to effect relative rotative movement of the doffer-sheath and spindle as required in picking and in doffing the cotton.

The slots 32 permit the spring strip 30 to move longitudinally as the balls 22a are rotated back and forth.

Picker stems of the type above described are necessarily made as light and as slim as possible for the reason that a large number thereof are mounted on the picker carrier referred to above, and because of the fact that this carrier is moved back and forth on the main frame of the machine to shift the picker stems into and out of the plants, it is desirable that the weight and inertia of said carrier, and of the stems carried by it, be as little as possible. Therefore, as heretofore constructed, it has frequently happened that stems of this kind would be broken and bent through engagement with heavy boughs or stems of the cotton plants.

The above described construction, however, obviates this disadvantage that characterized stems of this type as heretofore constructed and enables the spindles of the latter to be made of minimum size since the above described stem construction and mode of operation prevents each stem from lodging endwise against a rigid stem or bough as it is moved forward into the plants.

In machines of the class shown and described in our co-pending application the picker stems are arranged on their carrier in a bank made up of horizontal and vertical rows of picker stems, said bank comprising five or six hundred stems. The stems near the top of this bank may, if desired, be made as heretofore for the reason that the upper branches of the plants are frail and pliable and offer no substantial resistance to the picker stem, but it is desirable to employ the above described construction in connection with the picker stems making up the lower portion of the bank since the boughs and stems near the base of the plants are heavy and sturdy enough to injure or destroy picker stems of the ordinary constructions heretofore proposed.

What we claim is:

1. In a cotton harvesting picker mechanism, in combination, a carrier that is reciprocated on a rectilinear path; a picker stem comprising a barbed rotatable spindle pivotally and rotatably connected with said carrier adjacent to its rear end by a universal joint so that its free forward end portion is laterally movable universally, and means on said carrier yieldingly engaging said spindle at the rear of said unversal joint to hold said spindle with its axis approximately parallel with the direction of movement of said reciprocatory carrier.

2. In a cotton harvesting picker mechanism, in combination, a carrier that is reciprocated on a rectilinear path; a picker stem comprising a barbed rotatable spindle; a universal joint rotatably connecting the rear end portion of said spindle with said carrier so that its forward end portion is free to be swung laterally in any direction, and means on said carrier yieldingly engaging said spindle at the rear of said joint for holding said spindle with its axis approximately parallel with the direction of movement of said reciprocatory carrier.

3. In a cotton harvesting picker mechanism, in combination, a carrier that is reciprocated on a rectilinear path; a picker stem comprising a barbed rotatable spindle; a universal joint pivotally and rotatably connecting said spindle intermediate its ends with said carrier so that its free forward end can be swung laterally in any direction relative to said carrier, and means on said carrier yieldingly engaging said spindle at the rear of said joint for holding said spindle with its axis approximately parallel with the direction of movement of said reciprocatory carrier, said means including an apertured member of rubber mounted on said carrier through which the rear end portion of said spindle extends.

4. In a cotton harvesting picker mechanism, in combination, a reciprocatory carrier; a picker stem comprising a barbed rotatable spindle; a universal joint pivotally connecting said spindle adjacent to its rear end with said carrier so that it can be swung laterally in any direction relatively to said carrier, and means on said carrier engaging the rear end portion of said spindle for yieldingly holding the latter with its axis approximately parallel with the direction of movement of said reciprocatory carrier, said means including a slide movably mounted on said carrier and an apertured member of rubber mounted on said slide and through which said spindle extends, said slide being operable to vibrate said spindle.

5. In a cotton harvesting picker mechanism, in combination, a reciprocatory carrier; a picker stem comprising a sleeve rotatably and pivotally connected with said carrier by a universal joint, a barbed spindle rotatably mounted within said sleeve, means on said spindle for engaging said sleeve to limit relative rotary movement between said sleeve and spindle, means for imparting rotary reciprocatory movement to said spindle, a doffer-sheath bar disposed alongside of and parallel with said barbed spindle and having one end thereof connected with said sleeve, and means on said carrier engaging said rotatable spindle for yieldingly holding the latter with its axis approximately parallel with the direction of movement of said reciprocatory carrier.

6. In a cotton harvesting picker mechanism, in combination, a reciprocatory carrier movable back and forth on a rectilinear path; a row of picker stems each comprising a barbed rotatable spindle pivotally connected with said carrier adjacent to its rear end so that its free forward end portion is laterally movable, and means operable to vibrate each picker stem laterally on its pivot as said carrier is moved toward the plants.

7. In a cotton harvesting picker mechanism, in combination, a reciprocatory carrier movable back and forth on a rectilinear path; a row of picker stems each comprising a barbed rotatable spindle pivotally connected with said carrier adjacent to its rear end so that its free forward end portion is laterally movable; means yieldingly holding each spindle with its axis approximately parallel with the direction of movement of said reciprocatory carrier, and means operable to vibrate each picker stem laterally on its pivot as said carrier is moved toward the plants.

8. In a cotton harvesting picker mechanism, in combination, a reciprocatory carrier movable back and forth on a rectilinear path; a row of picker stems each comprising a barbed rotatable spindle pivotally connected with said carrier adjacent to its rear end by a universal joint so that its free forward end portion is laterally movable universally; means yieldingly holding each spindle with its axis approximately parallel with the direction of movement of said reciprocatory carrier, and means operable to vibrate each picker stem laterally on its universal joint as said carrier is moved toward the plants.

9. A cotton harvesting picker mechanism, constructed in accordance with claim 1 and including also a doffer-sheath bar disposed alongside of and parallel with said barbed spindle, said bar being rotatably supported to swing around said spindle on an axis coincident with the axis of the latter; means on said spindle for limiting the rotary movement of said doffer-sheath bar relatively to said spindle; means operable to rotate said barbed spindle alternately in opposite directions in timed relation with the axial movement thereof, and means yieldingly opposing rotary movement of said doffer-sheath bar by and with said spindle.

10. In a cotton harvesting picker mechanism, in combination, a reciprocatory carrier; a picker stem comprising a barbed rotatable spindle pivotally connected with said carrier adjacent to its rear end by a universal joint including a ball that is carried by said stem so that the free end portion of said spindle is laterally movable universally, said ball being formed upon opposite sides thereof with flat surfaces; means on said carrier yieldingly holding said spindle with its axis approximately parallel with the direction of movement of said reciprocatory carrier; a doffer-sheath bar connected with said ball and disposed alongside of and parallel with said barbed spindle, said bar and ball being rotatably supported by said spindle to swing around the axis of the latter; means for limiting relative movement between said doffer-sheath bar and said spindle; means operable to rotate said barbed spindle alternately in opposite directions in timed relation with the axial movements thereof, and a spring pressed stem co-operating with the flat surfaces on said ball to yieldingly oppose rotary movement of the latter and said doffer-sheath bar by said spindle.

11. In a cotton picking mechanism, the combination with the barbed spindle of a doffer-sheath bar constructed with a sleeve portion rotatably mounted upon said spindle; means for limiting relative movement between said spindle and doffer-sheath bar, and a spring pressed member bearing against said sleeve portion to yieldingly resist rotary movement of said sleeve with said spindle.

HARRIS G. PROUTY.
JOSEPH BARDWELL.